(12) United States Patent
Shuler et al.

(10) Patent No.: US 7,086,690 B2
(45) Date of Patent: Aug. 8, 2006

(54) BUMPER ASSEMBLY INCLUDING TWIN ENERGY ABSORBERS

(75) Inventors: Stephen F. Shuler, Royal Oak, MI (US); Alok Nanda, Bangalore (IN); Takaaki Nemoto, Mishima (JP); Frank Mooijman, Halsteren (NL); Katsuhisa Kumagai, Ichikawa (JP); A. D. Shaleena, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/925,316

(22) Filed: Aug. 24, 2004

(65) Prior Publication Data

US 2006/0043743 A1  Mar. 2, 2006

(51) Int. Cl.
*B60R 19/02* (2006.01)
(52) U.S. Cl. .......................... 296/187.03; 296/187.09; 293/132
(58) Field of Classification Search ........... 296/187.04, 296/187.03, 187.09; 293/102, 132, 146
See application file for complete search history.

(56) References Cited

U.S. PATENT DOCUMENTS

| 6,676,179 | B1 * | 1/2004 | Sato et al. ................. 293/115 |
| 6,726,262 | B1 | 4/2004 | Marijnissen et al. |
| 2001/0026073 | A1 | 10/2001 | Sato et al. |
| 2003/0047952 | A1 * | 3/2003 | Trappe ....................... 293/120 |
| 2003/0080573 | A1 * | 5/2003 | Marijnissen et al. ........ 293/132 |

FOREIGN PATENT DOCUMENTS

| EP | 1138556 | A2 | 10/2001 |
| EP | 1138556 | A3 | 10/2001 |
| EP | 1138557 | A2 | 10/2001 |
| EP | 1138557 | A3 | 10/2001 |

* cited by examiner

*Primary Examiner*—H Gutman
(74) *Attorney, Agent, or Firm*—Armstrong Teasdale LLP

(57) ABSTRACT

A bumper system for an automobile vehicle includes, in an exemplary embodiment, a first beam configured to attached to the vehicle and a first energy absorber coupled to the first beam. The first energy absorber is tunable for meeting predetermined criteria for both low speed and pedestrian impacts, and includes a plurality of tunable lobes. The lobes are tuned so that a stiffness of the first energy absorber varies from a center of the first energy absorber to each end.

15 Claims, 2 Drawing Sheets

BUMPER ASSEMBLY INCLUDING TWIN ENERGY ABSORBERS

BACKGROUND OF THE INVENTION

This invention relates generally to bumpers and, more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a foam energy absorber. Foam based energy absorbers typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of the beam and/or vehicle structure.

BRIEF DESCRIPTION OF THE INVENTION

In one aspect, a bumper system for an automobile vehicle is provided. The bumper system includes a first beam configured to attached to the vehicle and a first energy absorber coupled to the first beam. The first energy absorber is tunable for meeting predetermined criteria for both low speed and pedestrian impacts, and includes a plurality of tunable lobes. The lobes are tuned so that a stiffness of the first energy absorber varies from a center of the first energy absorber to each end.

In another aspect, a bumper system for an automobile vehicle is provided. The bumper system includes a first beam configured to attached to the vehicle and a first energy absorber coupled to the first beam. The first energy absorber is tunable for meeting predetermined criteria for both low speed and pedestrian impacts, and includes a frame portion and a body including a plurality of tunable lobes extending from the frame portion and spaced apart from each other. Each lobe has a stiffness that is different than at least one other lobe of the first energy absorber. The bumper system also includes a second beam configured to attached to the vehicle and a second energy absorber coupled to the second beam. The second energy absorber is tunable for meeting predetermined criteria for both low speed and pedestrian impacts and includes a frame portion and a body including a plurality of tunable lobes extending from the frame portion and spaced apart from each other. Each lobe having a stiffness that is different than at least one other lobe of the second energy absorber.

In another aspect, a bumper assembly for an automobile vehicle is provided. The bumper assembly includes a first beam configured to attached to the vehicle, a first energy absorber coupled to the first beam, and a fascia covering at least a portion of the first beam and the first energy absorber. The first energy absorber is tunable for meeting predetermined criteria for both low speed and pedestrian impacts, and includes a plurality of tunable lobes. The lobes are tuned so that a stiffness of the first energy absorber varies from a center of the first energy absorber to each end.

DETAILED DESCRIPTION OF THE INVENTION

A bumper system that includes twin tunable energy absorbers is described below in detail. In an example embodiment, an energy absorber of the non-foam type is attached to an upper beam and an energy absorber of the non-foam type is attached to a lower beam. The beams are fabricated, for example, from steel, aluminum, or glass mat thermoplastic (GMT). The energy absorbers, in the example embodiment, are fabricated from Xenoy® plastic material and are tunable so as to meet desired impact criteria, e.g., pedestrian and low speed impacts. More particularly, a front portion of each energy absorber is tuned, and tunable, to absorb pedestrian leg from impact, and a rear portion of each energy absorber is tuned, and tunable, for low speed barrier and pendulum impact. Impact forces during the specified types of impacts are maintained just below a predetermined level by deforming the energy absorber and beam until the kinetic energy of the impact event has been absorbed. When the impact is over, the energy absorbers return substantially to their original shape and retain sufficient integrity to withstand subsequent impacts.

Although the bumper system is described below with reference to specific materials (e.g. Xenoy® plastic material (commercially available from General Electric Company, Pittsfield, Mass.) for the energy absorber), the system is not limited to practice with such materials and other materials can be used. For example, each beam need not necessarily be a steel, aluminum, or GMT compression molded beam, and other materials and fabrication techniques can be utilized. Generally, each energy absorber is fabricated from materials that result in efficient energy absorption, and the beam materials and fabrication technique are selected to result in a stiff beam.

The bumper system is designed to manage loads across the width of the automobile to meet lower leg impact requirements. Two energy absorbers with varying stiffness and a relative depth manage deceleration, rotation, and sheer during a 40 kmph lower leg impact. The stiffness of the bumper system is balanced with the stiffness of the automobile components participating in the lower leg impact, for example, the grill, hood, and headlamps. Molded thermoplastic energy absorbers permit precise local variation of stiffness of the bumper system.

Figure 1:
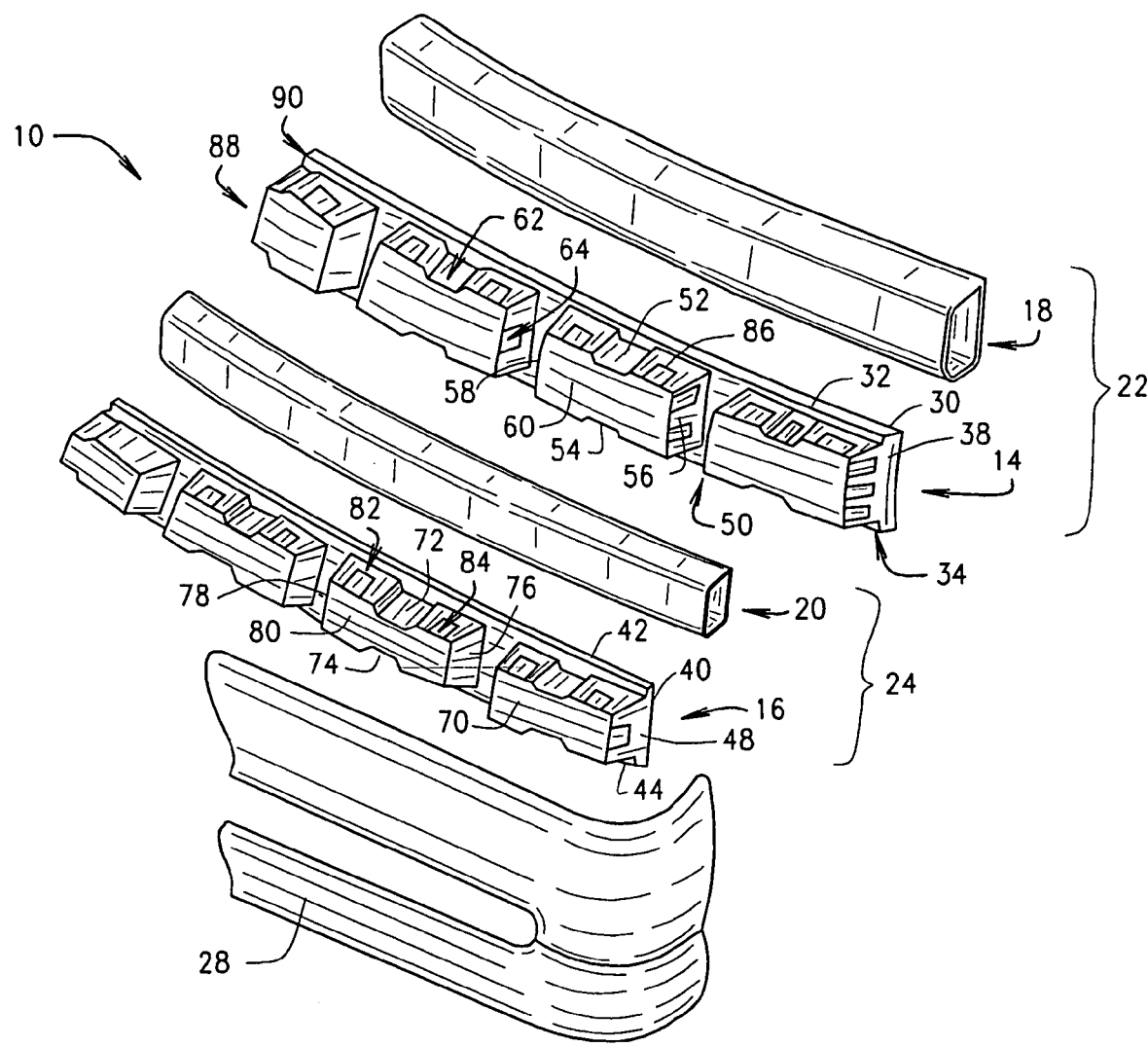
FIG. 1 is an exploded perspective illustration of a bumper assembly in accordance with an embodiment of the present invention.
Figure 2:
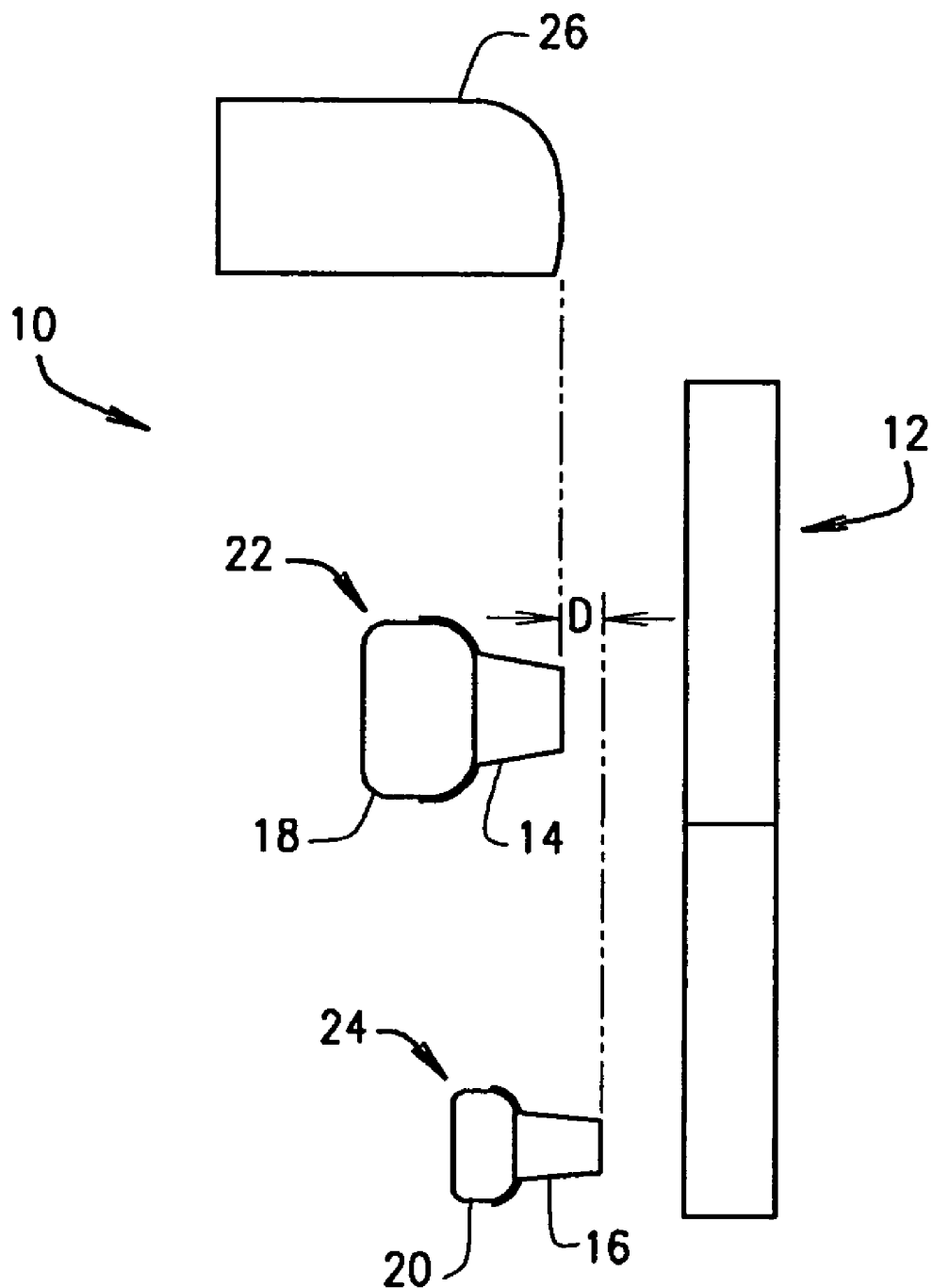
FIG. 2 is schematic illustration of a positional relationship between the bumper assembly shown in FIG. 1 and a human leg.

Referring to the drawings, FIG. 1 is an exploded perspective illustration of a bumper assembly 10 from the centerline to one end of bumper assembly 10. FIG. 2 is schematic illustration of a positional relationship between bumper assembly 10 and a human leg 12. Referring to FIGS. 1 and 2, bumper assembly 10 includes an upper energy absorber 14, a lower energy absorber 16, an upper beam 18 and a lower beam 20. Upper and lower energy absorbers 14 and 16 are attached to upper and lower beams 18 and 20 respectively forming an upper subassembly 22 and a lower subassembly 24. Beams 18 and 20 are attached to an automotive vehicle 26. As should be understood by those skilled in the art, beams 18 and 20 are attached to lengthwise extending frame rails (not shown).

A fascia 28 envelops upper and lower subassemblies 22 and 24 such that neither component is visible once attached to vehicle 26. Fascia 28 typically is generally formed from a thermoplastic material amenable to finishing utilizing conventional vehicle painting and/or coating techniques.

Beams 18 and 20, in the example embodiment, are fabricated from extruded aluminum. In other embodiments, beams 18 and 20 are fabricated from roll formed steel, compression molded glass mat thermoplastic (GMT), or injected molded thermoplastic. Beams 18 and 20 can have one of multiple geometries, including being configured as a B-section, a D-section, an I-beam, or having a C or W cross-sectional shape. The geometry of beams 18 and 20 are selected to provide a desired section modulus depending on the particular application in which the beams are to be used.

Upper energy absorber 14 includes a frame 30 having first and second longitudinally extending flanges 32 and 34, respectively, which overlap beam 18. Absorber 14 further includes a body 38 that extends outward from frame 30. Similarly, lower energy absorber 16 includes a frame 40 having first and second longitudinally extending flanges 42 and 44, respectively, which overlap beam 20. Absorber 16 further includes a body 48 that extends outward from frame 40.

Upper energy absorber body 38, sometimes referred to herein as a front portion, includes a plurality of lobes 50 extending from frame 30 between flanges 32 and 34. Each lobe 50 is spaced apart from each other and includes a first transverse wall 52 and a second transverse wall 54. Each lobe 50 also includes a first side wall 56 and a second side wall 58. An outer wall 60 extends between the distal ends of traverse walls 52 and 54, and side walls 56 and 58 to form a tunable hollow crush box 62 having a cavity 64 defined by traverse walls 52, 54, side walls 56, 58, and outer wall 60. Similarly, lower energy absorber body 48 includes a plurality of lobes 70 extending from frame 40 between flanges 42 and 44. Each lobe 70 is spaced apart from each other and includes a first transverse wall 72 and a second transverse wall 74. Each lobe 70 also includes a first side wall 76 and a second side wall 78. An outer wall 80 extends between the distal ends of traverse walls 72 and 74, and side walls 76 and 78 to form a tunable hollow crush box 82 having a cavity 84 defined by traverse walls 72, 74, side walls 76, 78, and outer wall 80.

Lobes 50 are tuned so that the stiffness of each lobe 50 varies successively from the centerline of upper energy absorber 14 to each end of upper energy absorber 14. Specifically, the lobes 50 at the ends have a stiffness less than the stiffness of the lobes 50 located at the center of upper energy absorber 14. Similarly, Lobes 70 are tuned so that the stiffness of each lobe 70 varies successively from the centerline of lower energy absorber 16 to each end of lower energy absorber 16. Specifically, the lobes 70 at the ends have a stiffness less than the stiffness of the lobes 60 located at the center of lower energy absorber 14. Also, the stiffness of lobes 70 of lower energy absorber 16 are greater than lobes 50 of upper energy absorber 14 at any point along a longitudinal axis of bumper assembly 10.

Lobes 50 and 70 can be tuned a number of ways. In one exemplary embodiment, transverse walls 52 and 54 of upper energy absorber 14 and/or transverse walls 72 and 74 of lower energy absorber 16 are rippled and include alternating raised areas and depressed areas which provide the transverse walls with an added degree of stiffness to resist deflection upon impact. In another exemplary embodiment, transverse walls 52 and 54 of upper energy absorber 14 and/or transverse walls 72 and 74 of lower energy absorber 16 further include a plurality of windows or openings 86. The width and depth dimensions of the ripples, as well as the shape and/or dimensions of openings 86, can be modified to achieve different stiffness characteristics as desired. For example, suitable shapes for opening 86 include, but are not limited to, a rectangular shape, a square shape, a triangular shape, or a teardrop shape.

In further exemplary embodiments, side walls 56 and 58 and transverse walls 52 and 54 of upper energy absorber 14 and/or side walls 76 and 78 and transverse walls 72 and 74 of lower energy absorber 16 vary linearly in thickness from a first front-most portion 88 to a rearmost portion 90. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 88 to rearmost portion 90 and is between about 1 mm to about 7 mm. In still further embodiments, the thickness of the walls are stepped. Particularly, the thickness of the walls of front-most portion 88 is constant and the thickness of the walls of rearmost portion 90 is constant with the walls of rearmost portion 90 thicker than the walls of front-most portion 88.

Lobes 50 and 70 are tunable in that by selecting a thickness of each portion 88 and 90, the response of lobes 50 and 70 can be altered. For example, front portion 88 of lobes 50 and 70 is tuned, and tunable, to absorb pedestrian leg form impact, and rear portion 90 is tuned, and tunable, for low speed and pendulum impact.

Each lobe 50 and 70 can, of course, have any one of a number of different geometries depending on the impact energy requirements for the vehicle. Each lobe 50 and 70 has an axial crush mode in both barrier and pendulum impacts according to Federal Motor Vehicle Safety Standard (FMVSS) and also has a stiffness tunability in order to meet the desired impact load deflection criteria.

Another aspect in appropriately tuning upper and lower energy absorbers 14 and 16 is the selection of the thermoplastic resin to be employed. The resin employed may be a low modulus, medium modulus or high modulus material as needed. By carefully considering each of these variables, energy absorbers meeting the desired energy impact objectives can be manufactured.

The characteristics of the material utilized to form upper and lower energy absorbers 14 and 16 include high toughness/ductility, thermally stable, high energy absorption capacity, a good modulus-to-elongation ratio and recyclability. While the energy absorbers may be molded in segments, the absorbers also can be of unitary construction made from a tough plastic material. An example material for the absorbers is Xenoy material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (l/hdpe), polypropylene (pp) and thermoplastic olefins (tpo).

As shown in FIG. 2, lower subassembly 24 extends further from vehicle 26 than upper subassembly 22. Particularly, the location of outer wall 80 of lower energy absorber 16 is farther from vehicle 26 than the location of outer wall 60 of upper energy absorber 14. This difference between outer walls 60 and 80 is defined as an offset distance D between upper and lower energy absorbers 14 and 16. The offset distance D can vary along the longitudinal axis of bumper assembly 10 to further tune bumper assembly.

The above described bumper assembly 10 permits better management of deceleration, rotation, and shear during lower leg impact. The stiffness and relative offset or depth of upper and lower energy absorbers 14 and 16 at each location along the longitudinal axis of bumper assembly 10 is matched to the stiffness of the vehicle components participating in the impact at each longitudinal location which facilitates meeting or exceeding government pedestrian safety requirements.

While the invention has been described in terms of various specific embodiments, those skilled in the art will recognize that the invention can be practiced with modification within the spirit and scope of the claims.

What is claimed is:

1. A bumper system for an automobile vehicle, said bumper system comprising:
   a first beam configured to attach to the vehicle;
   a first energy absorber coupled to said first beam, said first energy absorber being tunable for meeting predetermined criteria for both low speed and pedestrian impacts, said first energy absorber comprising a plurality of tunable lobes, said lobes tuned so that a stiffness of said first energy absorber varies from a center of said first energy absorber to each end;
   a second beam configured to attach to the vehicle; and
   a second energy absorber coupled to said second beam, said second energy absorber being tunable for meeting predetermined criteria for both low speed and pedestrian impacts, said second energy absorber comprising a plurality of tunable lobes, said lobes tuned so that a stiffness of said second energy absorber varies from a center of said second energy absorber to each end;
   wherein said stiffness of said second energy absorber is greater than said stiffness of said first energy absorber at any point along a longitudinal axis of said first and said second energy absorbers.

2. A bumper system in accordance with claim 1 wherein a front face of said second energy absorber is located farther from the vehicle than a front face of said first energy absorber when said bumper system is attached to the vehicle.

3. A bumper system in accordance with claim 1 wherein said first energy absorber comprises:
   a frame portion; and
   a body comprising said plurality of tunable lobes extending from said frame portion, said plurality of tunable lobes spaced apart from each other, each said lobe having a stiffness that is different than at least one other lobe of said first energy absorber.

4. A bumper system in accordance with claim 3 wherein said second energy absorber comprises:
   a frame portion; and
   a body comprising said plurality of tunable lobes extending from said frame portion, said plurality of tunable lobes spaced apart from each other, each said lobe having a stiffness that is different than at least one other lobe of said second energy absorber.

5. A bumper system in accordance with claim 4 wherein said stiffness of each said lobe of said first energy absorber varies successively from said center of said first energy absorber to each said end of said first energy absorber so that said lobes at said ends have a stiffness less than said stiffness of said lobes located at said center of said first energy absorber.

6. A bumper system in accordance with claim 1 wherein said first and second energy absorbers comprises a unitary elongated thermoplastic structure.

7. A bumper system for an automobile vehicle, said bumper system comprising:
   a first energy absorber, said first energy absorber being tunable for meeting predetermined criteria for both low speed and pedestrian impacts, said first energy absorber comprising:
      a frame portion; and
      a body comprising a plurality of tunable lobes extending from said frame portion and spaced apart from each other, each said lobe having a stiffness that is different than at least one other lobe of said first energy absorber; and
   a second energy absorber spaced apart from said first energy absorber, said second energy absorber being tunable for meeting predetermined criteria for both low speed and pedestrian impacts, said second energy absorber comprising:
      a frame portion; and
      a body comprising a plurality of tunable lobes extending from said frame portion and spaced apart from each other, each said lobe having a stiffness that is different than at least one other lobe of said second energy absorber;
   wherein said stiffness of said second energy absorber is greater than said stiffness of said first energy absorber at any point along a longitudinal axis of said first and said second energy absorbers.

8. A bumper system in accordance with claim 7 wherein a front face of said second energy absorber is located farther from the vehicle than a front face of said first energy absorber when said bumper system is attached to the vehicle.

9. A bumper system in accordance with claim 7 wherein said stiffness of each said lobe of said first energy absorber varies successively from said center of said first energy absorber to each said end of said first energy absorber so that said lobes at said ends have a stiffness less than said stiffness of said lobes located at said center of said first energy absorber.

10. A bumper assembly for an automobile vehicle, said bumper assembly comprising:
   a first beam configured to attach to the vehicle;
   a first energy absorber coupled to said first beam, said first energy absorber being tunable for meeting predetermined criteria for both low speed and pedestrian impacts, said first energy absorber comprising a plurality of tunable lobes, said lobes tuned so that a stiffness of said first energy absorber varies from a center of said first energy absorber to each end;
   a fascia covering at least a portion of said first beam and said first energy absorber;
   a second beam configured to attach to the vehicle; and
   a second energy absorber coupled to said second beam, said second energy absorber being tunable for meeting predetermined criteria for both low speed and pedestrian impacts, said second energy absorber comprising a plurality of tunable lobes, said lobes tuned so that a stiffness of said second energy absorber varies from a center of said second energy absorber to each end, said fascia covering at least a portion of said second beam and said second energy absorber;
   wherein said stiffness of said second energy absorber is greater than said stiffness of said first energy absorber at any point along a longitudinal axis of said first and said second energy absorbers.

11. A bumper assembly in accordance with claim 10 wherein a front face of said second energy absorber is located farther from the vehicle than a front face of said first energy absorber when said bumper system is attached to the vehicle.

12. A bumper assembly in accordance with claim 10 wherein said first energy absorber comprises:
   a frame portion; and
   a body comprising said plurality of tunable lobes extending from said frame portion, said plurality of tunable lobes spaced apart from each other, each said lobe having a stiffness that is different than at least one other lobe of said first energy absorber.

13. A bumper assembly in accordance with claim 12 wherein said second energy absorber comprises:
   a frame portion; and
   a body comprising said plurality of tunable lobes extending from said frame portion, said plurality of tunable lobes spaced apart from each other, each said lobe having a stiffness that is different than at least one other lobe of said second energy absorber.

14. A bumper assembly in accordance with claim 13 wherein said stiffness of each said lobe of said first energy absorber varies successively from said center of said first energy absorber to each said end of said first energy absorber so that said lobes at said ends have a stiffness less than said stiffness of said lobes located at said center of said first energy absorber.

15. A bumper assembly in accordance with claim 10 wherein said first and second energy absorbers comprises a unitary elongated thermoplastic structure.

* * * * *